G. A. E. KAEHLER.
AUTO RIM FORCER.
APPLICATION FILED JUNE 28, 1916.

1,219,948.

Patented Mar. 20, 1917.

George A. E. Kaehler, Inventor
By his Attorney,
James Hamilton

UNITED STATES PATENT OFFICE.

GEORGE A. E. KAEHLER, OF FRESNO, CALIFORNIA.

AUTO-RIM FORCER.

1,219,948.　　　Specification of Letters Patent.　　Patented Mar. 20, 1917.

Application filed June 28, 1916. Serial No. 106,372.

*To all whom it may concern:*

Be it known that I, GEORGE A. E. KAEHLER, a citizen of the United States of America, residing at Fresno, in the county of Fresno and State of California, have invented certain new and useful Improvements in Auto-Rim Forcers, of which the following is a specification, reference being had to the accompanying drawings.

This invention relates to improvements in devices for forcing by leverage the rim of an automobile-tire into its proper position on an automobile-wheel; and an object of this invention is to provide a device of this character which will be simple in construction, comparatively cheap in manufacture and efficient in use.

Figure 1:
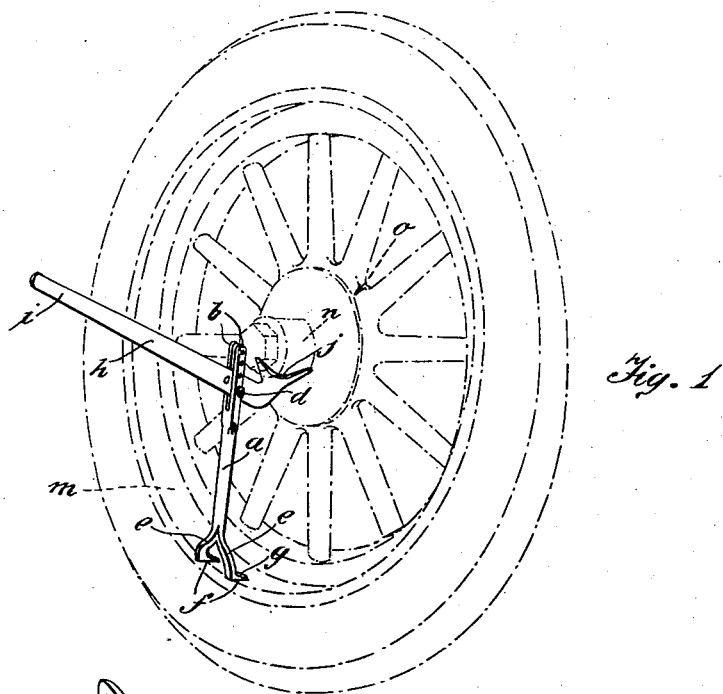
Figure 2:
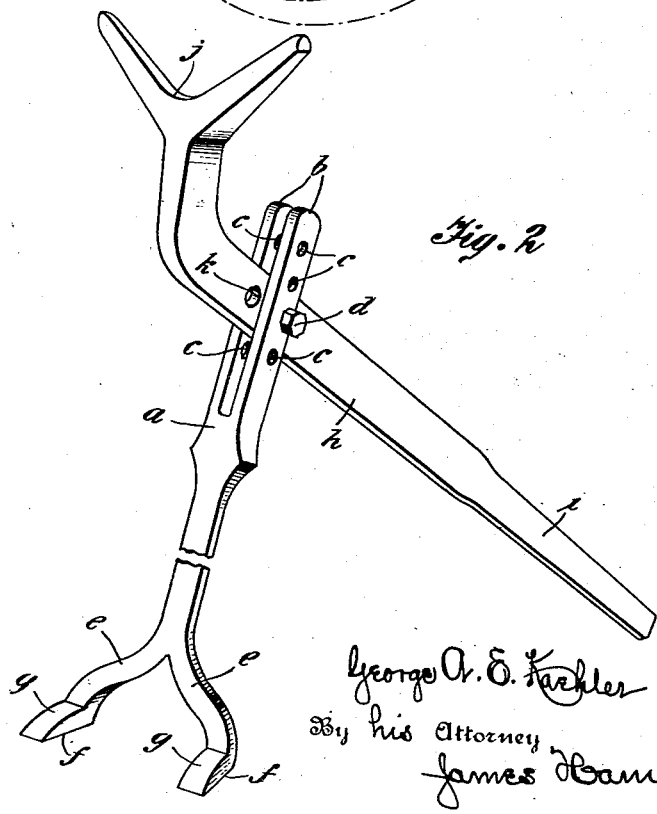

In the drawings illustrating the principle of this invention and the best mode now known to me of applying that principle, Figure 1 is a perspective view illustrating my new auto rim-forcer in use; and Fig. 2 is a perspective view of my new auto rim-forcer.

The upper part of the vertically-disposed body portion $a$ is bifurcated; and, in each of the two branches $b$, there is formed a vertical series of holes $c$ adapted to receive a pivot-bolt $d$. From the lower end of the body-portion $a$, there branches a pair of legs $e$, each of which terminates in a foot $f$, the upper surface $g$ of which is inclined so that the foot $f$ is wedge-shaped, as is best shown in Fig. 2, so that the apparatus may be rested firmly upon the rim $m$ without tipping or swinging from side to side. The bottom faces of the feet $f$ are made substantially flat. The space between the legs $e$ and feet $f$ serves to receive any projection or protuberance (*e. g.*, a rim-lock) formed on the inner face of the rim $m$ and thereby insures that the apparatus shall always have a firm footing on the rim. Between the branches $b$, there is passed a horizontally-disposed lever $h$, one end of which terminates in a handle $i$ and the other end of which is formed with a V-shaped hub-seat $j$ adapted to fit and hold securely the hub $n$ of any ordinary automobile-wheel $o$. The lever $h$ is further formed with holes $k$, through one of which passes the pivot-bolt $d$.

When the device is put in use, the position of the pivot-bolt $d$ is first adjusted so that the device is fitted to the particular size of wheel upon which the rim $m$ is to be forced. The feet $f$ are then rested upon the rim $m$; and force is applied to the handle-end $i$ of the lever $h$, the hub-seat $j$ formed upon the other end of the latter then receiving the hub $n$ of the wheel. By imparting to the handle-end $i$ of the lever $h$ a downward and inward swing and thus stretching or expending the rim $m$, it is made to slide onto the wheel $o$ smoothly. The wedge shape of the feet $f$ enables the rim-forcer to be withdrawn with ease from between the wheel $o$ and the rim $m$ and serves to guide the rim $m$ gently into place.

I claim:

A device for forcing rims on automobile wheels, including a substantially vertically-disposed body-portion; and a substantially horizontally-disposed hand lever pivotally mounted in said body-portion near the upper end thereof and having one of its ends forked and formed with a recessed hub-seat shaped to receive and hold securely the wheel-hub; the lower end of said body-portion being bifurcated and formed with a pair of spaced legs that terminate in feet which are disposed at substantially right angles to the legs and are wedge-shaped and formed with substantially flat lower faces.

Signed at Fresno in the county of Fresno and State of California, this 21st day of June, A. D., 1916, in the presence of the two undersigned witnesses.

GEORGE A. E. KAEHLER.

Witnesses:
F. E. COOK,
H. T. KIRCH.